(12) United States Patent
Chen (10) Patent No.: US 8,560,874 B2
(45) Date of Patent: Oct. 15, 2013

(54) METHOD AND SYSTEM FOR POWER SAVING MANAGEMENT

(75) Inventor: Qiaogang Chen, Shenzhan (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 191 days.

(21) Appl. No.: 13/059,056

(22) PCT Filed: Jan. 21, 2009

(86) PCT No.: PCT/CN2009/070235
§ 371 (c)(1),
(2), (4) Date: Feb. 14, 2011

(87) PCT Pub. No.: WO2010/017701
PCT Pub. Date: Feb. 18, 2010

(65) Prior Publication Data
US 2011/0161709 A1    Jun. 30, 2011

(30) Foreign Application Priority Data
Aug. 15, 2008   (CN) .......................... 2008 1 0210471

(51) Int. Cl.
*G06F 1/32* (2006.01)

(52) U.S. Cl.
CPC ................................. *G06F 1/3234* (2013.01)
USPC .......................... 713/323; 713/310; 713/324

(58) Field of Classification Search
USPC ........................................................ 713/320
See application file for complete search history.

(56) References Cited

U.S. PATENT DOCUMENTS

| | | | |
|---|---|---|---|
| 5,535,401 A | 7/1996 | Rawson, III et al. | |
| 7,437,576 B2 * | 10/2008 | Makiyama et al. | 713/300 |
| 7,581,125 B2 * | 8/2009 | Ranganathan et al. | 713/320 |
| 8,219,839 B2 * | 7/2012 | Akimoto | 713/320 |
| 8,225,119 B2 * | 7/2012 | Jain et al. | 713/320 |
| 2002/0016151 A1 | 2/2002 | Romans | |
| 2003/0005339 A1 * | 1/2003 | Cohen et al. | 713/300 |
| 2004/0203976 A1 | 10/2004 | Gupta et al. | |
| 2005/0177755 A1 * | 8/2005 | Fung | 713/300 |
| 2005/0289371 A1 * | 12/2005 | Makiyama et al. | 713/300 |
| 2006/0259797 A1 * | 11/2006 | Fung | 713/300 |
| 2007/0067656 A1 * | 3/2007 | Ranganathan et al. | 713/320 |
| 2007/0135086 A1 * | 6/2007 | Stanford | 455/402 |
| 2008/0009304 A1 | 1/2008 | Fry | |
| 2010/0325465 A1 * | 12/2010 | Kazama et al. | 713/340 |
| 2011/0213996 A1 * | 9/2011 | Imine et al. | 713/323 |
| 2011/0313582 A1 * | 12/2011 | van Megen et al. | 700/292 |

FOREIGN PATENT DOCUMENTS

CN            1115883 A        1/1996

OTHER PUBLICATIONS

PCT International Search Report dated May 21, 2009 in PCT Application No. PCT/CN2009/070235.

* cited by examiner

*Primary Examiner* — Ryan Stiglic
(74) *Attorney, Agent, or Firm* — Bright IP Law Offices (57) ABSTRACT

The present invention discloses a method and a system for power saving management. The method includes: a new power consuming state attribute added for existing device object of the communication network management system is configured, wherein the power consuming state attribute is used for indicating the power consuming state of the electrical energy; performing the power saving management on the device by setting the power consuming state of the object corresponding to the device. With the above technical solution, the division of the state information could be clearer and more efficient, meanwhile, the redundancy can be eliminated, in addition, has the feather of wide adaptability.

5 Claims, 10 Drawing Sheets

Fig.13

METHOD AND SYSTEM FOR POWER SAVING MANAGEMENT

CROSS-REFERENCE TO RELATED APPLICATIONS

This application is the U.S. National Phase application under 35 U.S.C. §371 of International Application PCT/CN2009/070235 filed Jan. 21, 2009, which claims priority to Chinese Application 200810210471.X filed Aug. 15, 2008.

FIELD OF THE INVENTION

The present invention relates to communication field, and in particular to a method and a system for power saving management.

BACKGROUND OF THE INVENTION

Figure 1:
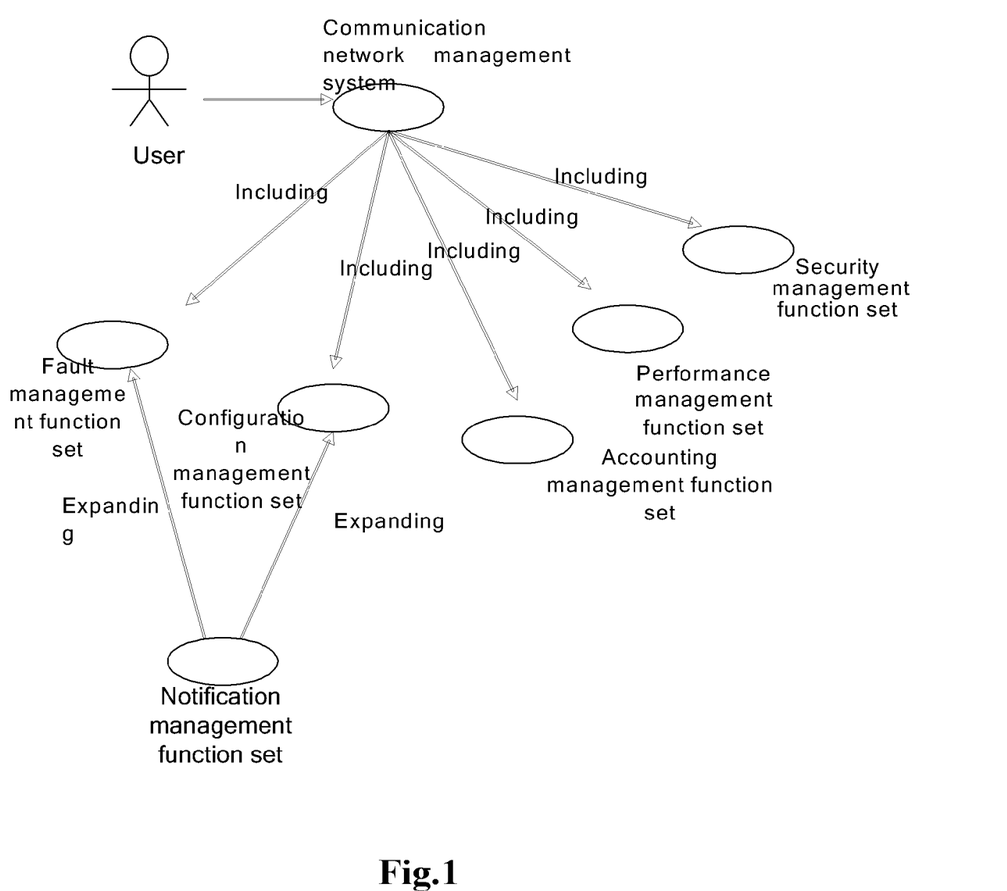
FIG. 1 is a schematic view of the communication network management system in the relevant technology.

In a communication network, the network is composed of a plurality of communication nodes, and these communication nodes (network nodes) are also called as network elements. The network elements are connected with each other via communication circuits which comprise a plurality of modes such as fiber cables. In addition, the network elements are distributed in individual areas; and a central network management system is provided for configuring, maintaining and monitoring the devices of the network elements. The central network management system performs the configuration, maintenance and monitoring on each node of the network by remote communication. FIG. 1 is a schematic figure of a communication network management system in related art. As shown in FIG. 1, the functions of the communication network management system may be further divided into a fault management function set, a configuration management function set, an accounting management function set, a performance management function set and a security management function set which are respectively realized by different function means, and the fault management function set and the configuration management function set are expanded with a notification management function set. Presently, study and development of power saving devices is key aspect of research in the communication field.

There are a plurality of network nodes in the integrated management communication network, and each node is one communication device. A network element may be further divided into smaller communication devices, for example, a single board. In order to match the power saving capacity of the communication device, the network management should have the corresponding management abilities. At present, an international management method is a management with object oriented, i.e., the device is abstracted as an object for management, and one device in the communication network is indicated as an object in the network management system.

At present, the management technology for power saving function of the device in the communication network has not been matured.

SUMMARY OF THE PRESENT INVENTION

The present invention is put forward aiming at the problem in prior art that the present network management system lacks an effective power saving management scheme for the device, therefore, the present invention mainly aims at providing an improved power saving management scheme to solve the problem in the relevant technology.

For this reason, the present invention aims to provide a power saving management method according to one aspect of the present invention to perform the power management on the device in the communication network, and to perform the power saving management on the communication device by performing the power management on the object which indicates the device in the communication network management system.

According to the embodiment of the present invention, the power saving management method comprises: setting a power consuming state attitude in a device object of communication network management system, and configuring the power consuming state attitude, such that the power consuming state attitude is used to represent a power consuming state of electrical energy; and performing the power saving management to the device by setting the power consuming state attitude of the object corresponding to the device.

Wherein, the power consuming state comprises at least one of the following: a full power mode, a power saving mode, a sleeping mode and a shutdown mode.

In addition, the method further comprising: setting a power consuming status attribute according to the power consuming state attribute, wherein the power consuming status attribute comprises a power consuming status attribute value which is used to indicate a percentage of a power consuming of the operation of the device under a power consuming state corresponding to the power consuming state attribute versus a maximum power consuming.

Preferably, the step of setting the power consuming status attribute value concretely comprises: automatically setting the power consuming status attribute value as the maximum power of the operation of the device, in the case that the power consuming state attribute of the device is set as the full power mode; automatically setting the power consuming status attribute value as a percentage of a minimum power of the device capable of ensuring normal services versus the maximum power consuming, in the case that the power consuming state attribute of the device is set as the power saving mode; automatically setting the power consuming status attribute value as a percentage of a minimum power of the device which keeps memories before sleeping and the maximum power consuming, in the case that the power consuming state attribute of the device is set as the sleeping mode; and automatically setting the power consuming status attribute value of the shutdown mode as that the device does not consume power, in the case that the power consuming state attribute of the device is set as the shutdown mode.

In addition, the method comprises further: setting a device object corresponding to the subordinate device as the full power mode in the case that both the device and a subordinate device of the device support the power consuming state attribute and when the device object is set as the full power mode; setting a device object corresponding to the subordinated device as the full power mode, the power saving mode, the sleeping mode or the shutdown mode when the device object is set as the power saving mode; and setting a device object corresponding to the subordinate device as the sleeping mode or the shutdown mode in the case that the device object is set as the sleeping mode or the shutdown mode; operating the device and the subordinate device of the device according to the full power mode, in the case that neither the device nor the subordinate device of the device supports the power saving mode and when the device is set as the power saving mode; returning a setting failure operating message and keeping the device in the original state, in the case that the device and/or the subordinate device of the device does not support the sleeping mode and/or the shutdown mode and when the device is set as the sleeping mode or the shutdown mode.

According to another aspect of the present invention, a power saving management system is provided, and is used to perform power saving management to an object device thereof.

According to the embodiment of the present invention, the power saving management system comprises: configuring means, configured to set a power consuming state attitude in the device object of a network management system, and to configure the power consuming state attribute, such that the power consuming state attitude is used to represent a power consuming state of electrical energy; and managing means, configured to perform the power saving management to the device by setting the power consuming state of the object corresponding to the device.

In addition, the configuring means further comprises: setting means, configured to set a power consuming status attribute according to the power consuming state attribute, wherein the power consuming status attribute comprises a power consuming status attribute value which is used to represent a percentage of a power consuming of the operation of the device under a power consuming state corresponding to the power consuming state attribute versus a maximum power consuming.

In addition, the management means further comprises: query means, configured to query the power consuming state attribute and/or the power consuming status attribute of the object.

Wherein, the power consuming state comprises at least one of the following modes: a full power mode, a power saving mode, a sleeping mode and a shutdown mode.

In addition, the management means further comprises: notification means, configured to report a changing notification of the power consuming state attribute and/or power consuming status attribute in the case that that the power consuming state attribute and/or the power consuming status attribute are/is changed.

The power saving management of the device is carried out by applying the technical proposal of the present invention, configuring a new power consuming state attribute added for existing device object of the communication network management system, and setting the power consuming state, therefore solving the problem that the power saving management on the device of the communication network management system can not be realized in the prior art, and ensuring the management more standardization and have wide adaptability.

Other characteristics and advantages of the present invention will be described in the following specification, and will be apparent partly from the specification and embodiments of the present invention. The objects and other advantages can be realized and obtained through the structure of the specification, claims, and the drawings.

BRIEF DESCRIPTION OF THE DRAWINGS

The drawings in the specification provide a further understanding to the present invention and constitute a part of the application. The exemplary embodiments of the present invention and the explanation thereof are given thereafter by way of illustration only, and thus are not limitative of the present invention, and wherein.

DETAILED DESCRIPTION

Function Overview

Figure 2:
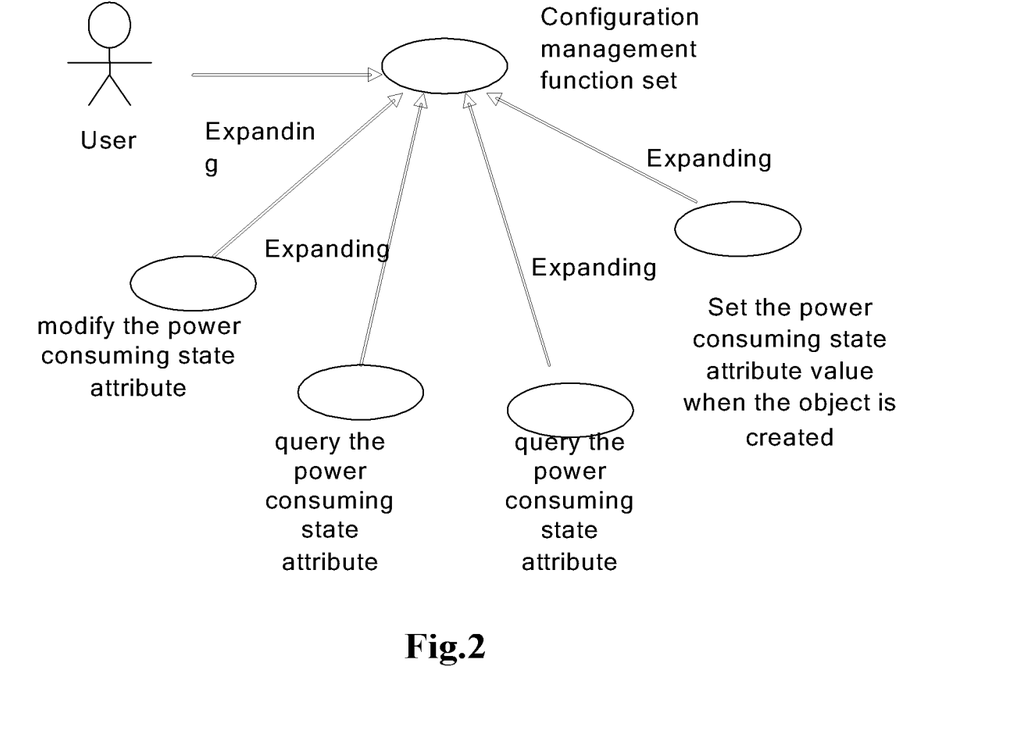
FIG. 2 is a schematic view of four new functions expanded intensively by the configuration function according to the embodiment of the present invention.
Figure 3:
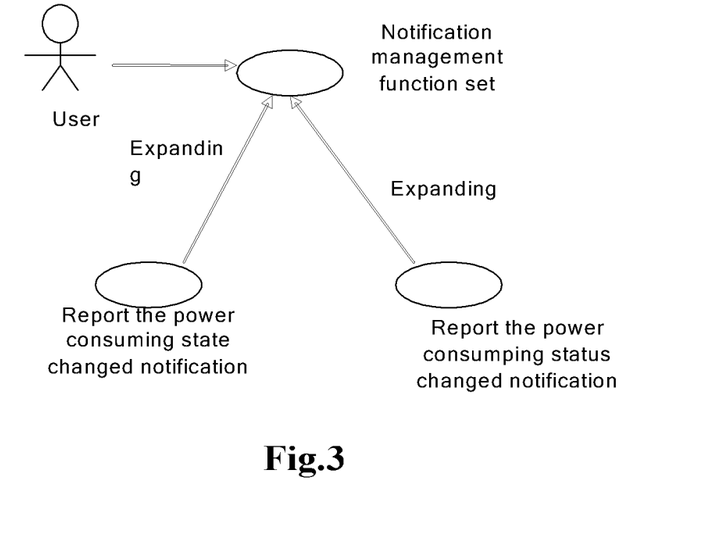
FIG. 3 is a schematic view of two new state changed notifications expanded intensively by the notification function according to the embodiment of the present invention.

Considering about the problem that the power saving management on the device can not be realized in the relevant technology, the embodiment of the present invention provides an improved power saving management scheme. In the embodiment of the present invention, by adding a new power consuming state attribute for existing device management object, namely, abstracting the power saving function into a state attribute, and managing the state attribute, the power saving function of the device in the communication network is managed. As shown in FIG. 2, the configuration management function of the power saving management function of the embodiment of the present invention in the communication network management system is expanded intensively to four functions which are respectively revising the power consuming state attribute of the object, querying the power consuming state attribute of the object, querying the power consuming status attribute of the object and setting the value of the power consuming state attribute when the object is created. In addition, as shown in FIG. 3, the embodiment of the present invention also expands intensively two functions in the communication network management system, and the functions are respectively reporting the variation notification of the power consuming state and reporting the variation notification of the power consuming status.

The preferable embodiments of the present invention will be detailed hereinafter in connection with the drawings. What should be understood is that the preferable embodiments detailed hereafter are given by way of illustration only, and thus are not limitative of the present invention. If un-conflictive, the embodiments of the present invention can be inter-combined with the characteristics in the embodiments.

Method Embodiment

According to the embodiment of the present invention, a power saving management method is provided for performing the power saving management on the device in the communication network, and realizes the power saving management on the communication device by performing the power saving management on the object which indicates the device in the communication network management system.

Figure 4:
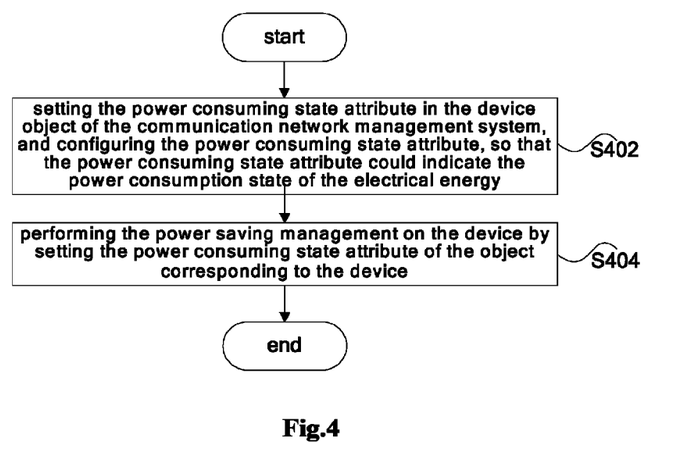
FIG. 4 is a flowchart of the power saving management method according to the embodiment of the present invention.

FIG. 4 is a flowchart of the power saving management method according to the embodiment of the present invention. As shown in FIG. 4, the power saving management method according to the embodiment of the present invention comprises the following procedures (step S402 to step S404):

Step S402, setting a power consuming state attribute in a device object of a communication network management system, namely, adding a power consuming state attribute in the existing device object, and configuring the power consuming state attribute to ensure that the power consuming state attribute is used for indicating the power consuming state of the electrical energy; concretely, the power consuming state attribute can be configured for four modes: a full power mode, a power saving mode, a sleeping mode, a shutdown mode; after the four modes are configured in the power consuming state attribute, when the device is performed the power saving management, the power consuming state attribute of the device object can be set, namely, selecting the four modes in the power consuming state attribute to manage the device.

Preferably, the power consuming status attribute can be automatically set according to the power consuming state attribute, wherein the power consuming status attribute comprises a power consuming status value which is used for indicating the percentage of the power consuming during operation under the power consuming state corresponding to the power consuming state attribute of the device and the maximum power consuming;

Step S404, the power saving management on the device is performed by setting the power consuming state attribute of the object corresponding to the device.

By using the technical proposal, the power saving management on the device object in the network system can be realized.

The four power consuming state attributes in the present invention will be detailed hereinafter in connection with the table 1.

I. Under the condition that the power consuming state attribute of the device is set as the full power mode, the device will automatically set the power consuming status attribute value as the maximum device operation power.

II. Under the condition that the power consuming state attribute of the device is set as the power saving mode, the device will automatically set the power consuming status attribute value as the percentage of the minimum power that can ensure the normal service operation of the device and the maximum power consuming.

III. Under the condition that the power consuming state attribute of the device is set as the sleeping mode, the device will automatically set the power consuming status attribute value as the percentage of the minimum device power that keeps the memory before sleeping and the maximum power consuming.

IV. Under the condition that the power consuming state attribute of the device is set as the shutdown mode, the device will automatically set the power consuming status attribute value as not consuming the power of the device.

TABLE 1

| State attribute | Description |
| --- | --- |
| Full Power | The full power mode, when the state is set, the device (the object) is operated under the maximum power and will not consider power saving. If a large device containing parts that also support this attribute, when the container object set to full power state, all it's part shall turn into full power state. |
| Power Saving | The power saving mode, when the state is set, the device can be partially operated in order to save power, if the service bore by the device is less than the maximum service, the device can use the power consuming as little as possible to ensure the operation of normal service; if the device has no power saving capability, the effect by setting the power consuming state is the same as the full power mode; if the smaller device comprised in the larger device also supports the power consuming state attribute, when the larger device is set as the power saving mode, the smaller device can still operate the full power mode; if the smaller device is set as the power saving mode, then the larger device shall be also set as the power saving mode. |
| Sleeping | The sleeping mode, when the state is set, the device is not operated, but the device can maintain the latest memory before sleeping, and the consumed power is just for maintaining the memory; the device in the sleeping state can be recover to the operation state quickly, if the device does not support the setting of the state, the system will send a setting failure message. |
| Shutdown | The shutdown mode, when the state is set, the power of the device is shut down without consuming power; if the device does not support the setting of the state, the system will send a setting failure message. |

Table 1 shows that, under the condition that both the device and the subordinate device support the power consuming state attribute, when the device object is set as the full power mode, the device object corresponding to the subordinate device is also set as the full power mode; when the device object is set as the power saving mode, the device object corresponding to the subordinate device is set as the full power mode, the power saving mode, the sleeping mode or the shutdown mode; under the condition that the device object is set as the sleeping mode or the shutdown mode, the device object corresponding to the subordinate device is set as the sleeping mode or the shutdown mode; under the condition that both the device and the subordinate device do not support the power saving mode, when the device is set as the power saving mode, the device and the subordinate device will be operated under the full power mode; under the condition that the device and/or the subordinate device do/does not support the sleeping mode and/or shutdown mode, when the device is set as the sleeping mode or the shutdown mode, the failed operation message will be returned, and the device will maintain the prior state.

Figure 5:
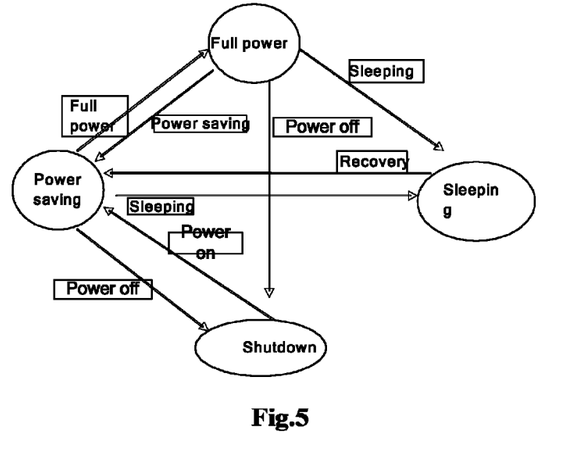
FIG. 5 is a schematic view of the power consuming state conversion according to the embodiment of the present invention.

In addition, in Table 1, conversion of the power consuming state as shown in FIG. 5, power saving operation is needed while switching the full power mode to the power saving mode, on the contrary, recovery operation is needed while switching the power saving state to the full power state to perform full power operation; shutdown action is needed while switching the full power mode to the shutdown mode, and sleeping operation is needed while switching the full power mode to the sleeping mode; the sleeping operation is needed while switching the power saving mode to the sleeping mode, and waking operation is needed while switching the sleeping mode to the power saving mode; shutdown operation is needed while switching the power saving mode to the shutdown mode, and starting operation is needed while switching the shutdown mode to the power saving mode.

Figure 6:
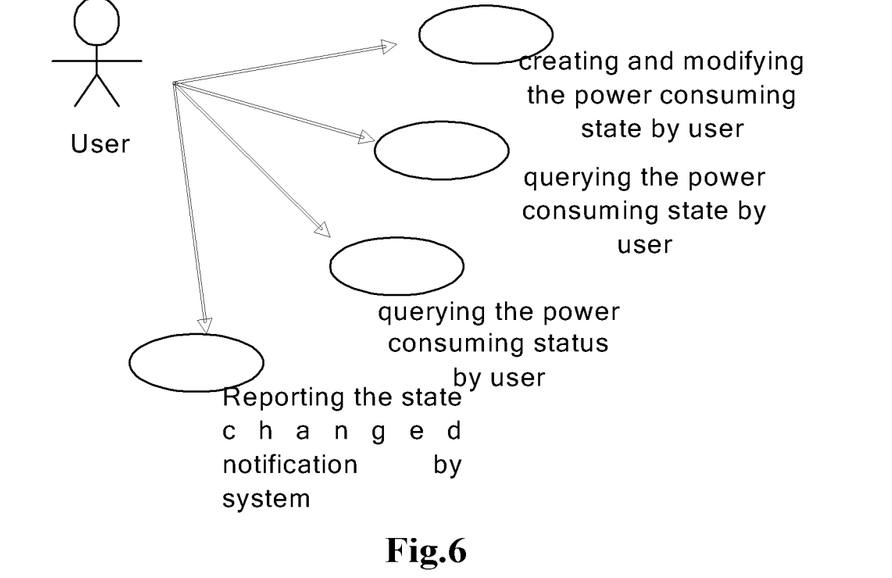
FIG. 6 is a schematic view of the power saving management function for UML.

The embodiment of the present invention will be detailed hereinafter in connection with examples, as shown in FIG. 6, which comprises the following procedures:

The first step, setting value for the power consuming state attribute when an object is created by the user, if the device supports the power saving management, the user sets a value for the power consuming state attribute of the object, and the value can be one of the four state values as required. The device will perform the relevant action according to the meaning corresponding to the state value (as shown in Table 1), for example, the user establishes a network element object on the network management, and sets the power consuming state as power saving; the user establishes one or more than one single board objects, and sets the power consuming state as power saving;

The second step, querying the power consuming state of the object; the user selects a network element (or a single board) in the network management, sends a Query command to get power consuming state and obtains the power consuming state attribute;

The third step, querying the power consuming status value of the object; the user selects a network element (or a board) in the network management, sends the power consuming status value query command, and obtains the power consuming status, for example, 70 percent of the maximum power;

The fourth step, notifying the attribute variation; after the power consuming state or the power consuming state is changed the network management will produce a state changed notification to remind the user. The notification comprises the object name which the state is varied and the message of the newest state value.

Figure 7:
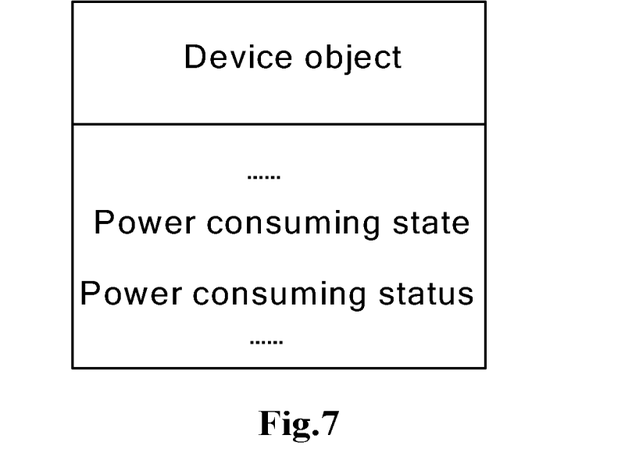
FIG. 7 is a schematic view of the display of the object and the attribute according to the embodiment of the present invention.

The power consuming state and the power consuming status can be displayed in the way as shown in FIG. 7.

Setting an Initial Value for the Power Consuming State Attribute

Figure 8:
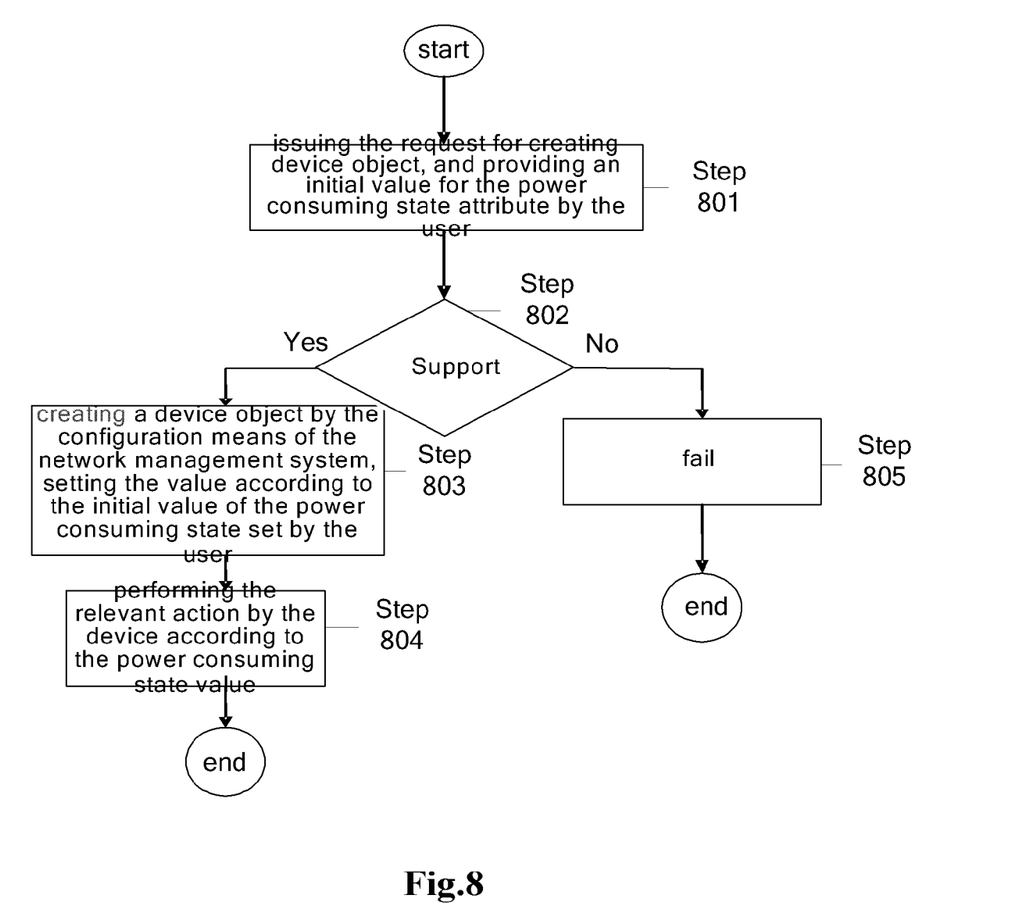
FIG. 8 is a flowchart of the detailed process for setting the initial value of the power consuming state attribute when the object is created according to the embodiment of the present invention.

The procedure of setting the initial value for the power consuming state attribute will be detailed hereinafter when the object is created, as shown in FIG. 8, which comprises the following steps:

Step 801, issuing the request for establishing device object, and providing an initial value for the power consuming state attribute by the user;

Step 802, determining whether the created device object support the power consuming state attribute or not; if support, Step 803 is performed, and if not, Step 805 is performed;

Step 803, establishing a device object by the configuration means of the network management system, setting the value according to the initial value of the power consuming state set by the user, and performing Step 804;

Step 804, performing the relevant action by the device according to the power consuming state value;

Step 805, returning the failed message by the network management system.

Revising the Power Consuming State of the Object

Figure 9:
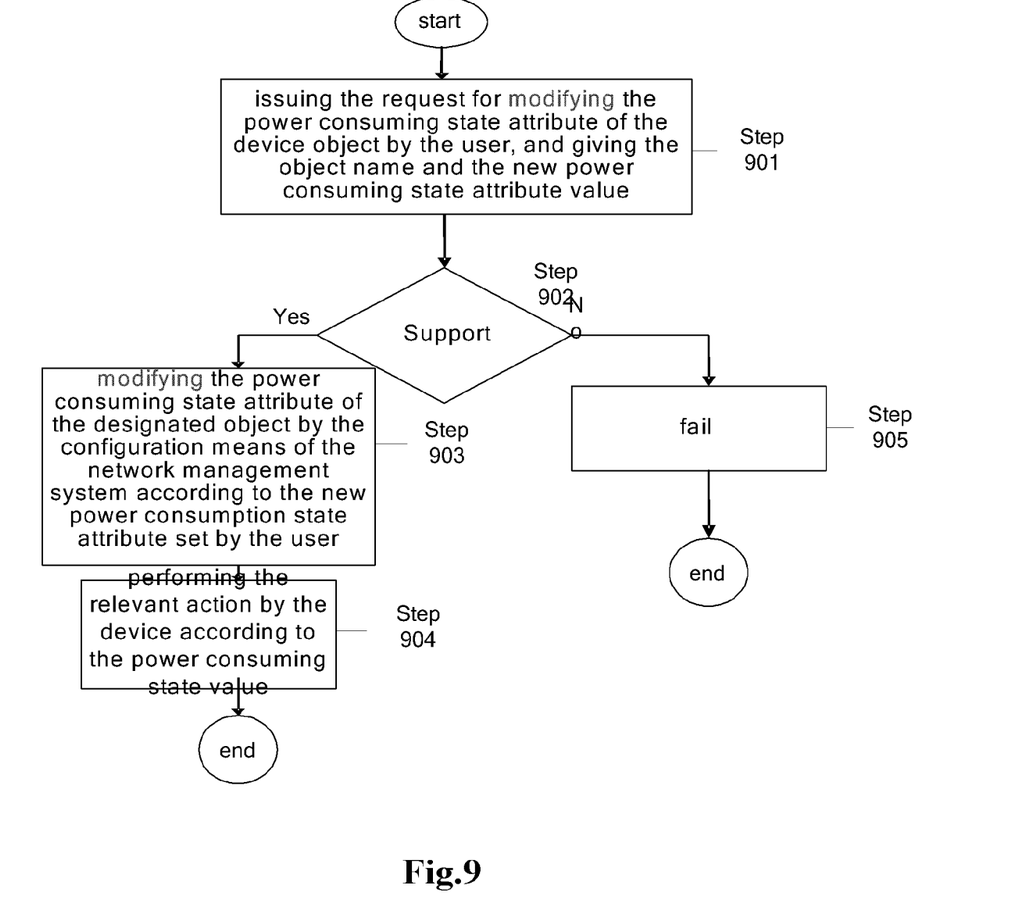
FIG. 9 is a flowchart of the detailed process for revising the power consuming state of the object according to the embodiment of the present invention.

The procedure of revising the power consuming state of the object will be detailed hereinafter, as shown in FIG. 9, which comprises the following steps:

step 901, issuing the request for revising the power consuming state attribute of the device object by the user, and giving the object name and the new power consuming state attribute value;

step 902, determining whether the device object supports the power consuming state attribute or not; if support, Step 903 is performed, if not, Step 905 is performed;

step 903, revising the power consuming state attribute of the designated object by the configuration means of the network management system according to the new power consuming state attribute set by the user, and performing Step 904;

step 904, performing the relevant action by the device according to the power consuming state value;

step 905, returning the failed message by the network management system.

Figure 10:
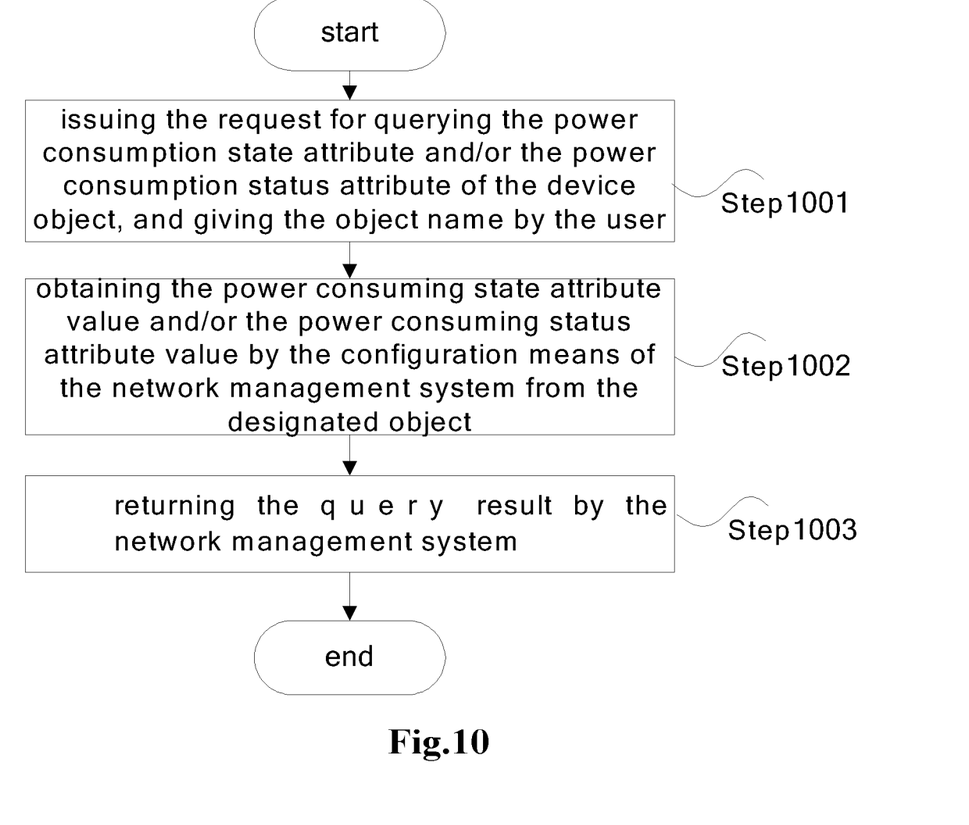
FIG. 10 is a flowchart of the detailed process for querying the power consuming state attribute and/or the power consuming status attribute of the object according to the embodiment of the present invention.

Querying the Power Consuming State Attribute and/or the Power Consuming Status Attribute of the Object The procedure of querying the power consuming state attribute and/or the power consuming status attribute of the object will be detailed hereinafter, as shown in FIG. 10, which comprises the following steps:

step 1001, issuing the request for querying the power consuming state attribute and/or the power consuming status attribute of the device object, and giving the object name by the user;

step 1002, obtaining the power consuming state attribute value and/or the power consuming status attribute value by the configuration means of the network management system from the designated object;

step 1003, returning the query result by the network management system.

Figure 11:
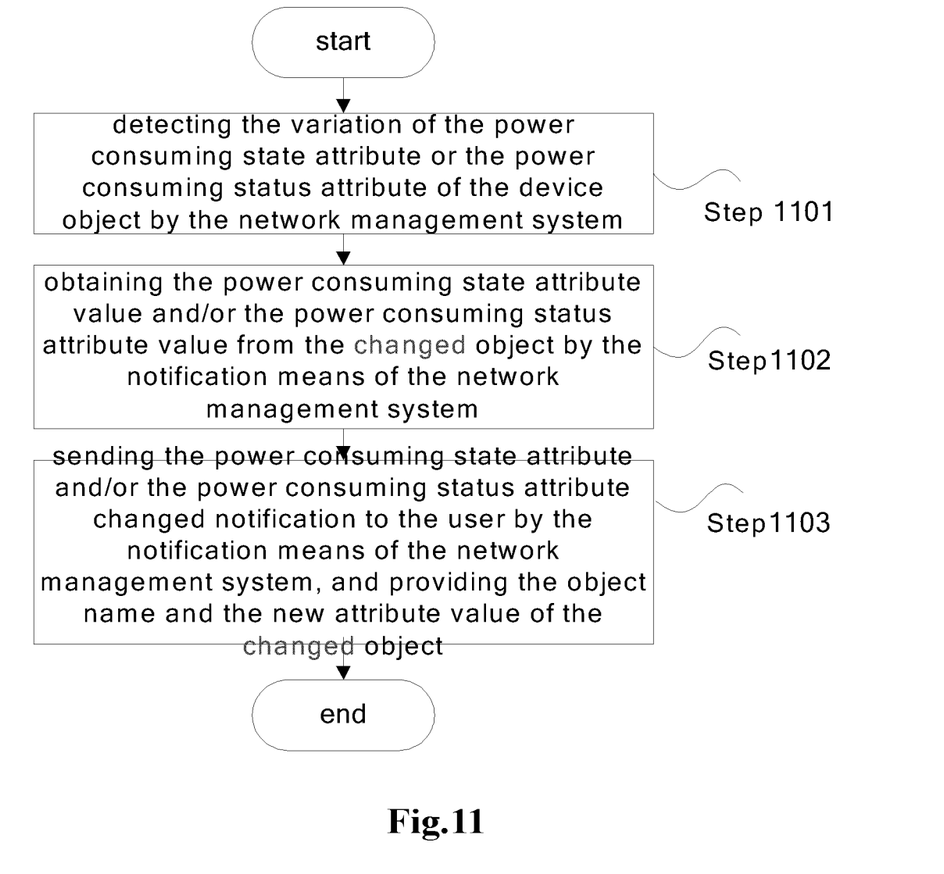
FIG. 11 is a flowchart of the detailed process for the network management system reporting the changed notification of the power consuming state attribute and/or the power consuming status attribute according to the embodiment of the present invention.

Reporting the Power Consuming State Attribute and/or the Power Consuming Status Attribute Variation Notification The procedure of reporting the power consuming state attribute and/or the power consuming status attribute variation notification by the network management system is detailed hereinafter, as shown in FIG. 11, which comprises the following steps:

step 1101, detecting the variation of the power consuming state attribute or the power consuming status attribute of the device object by the network management system;

step 1102, obtaining the power consuming state attribute value and/or the power consuming status attribute value from the varied object by the notification means of the network management system;

step 1103, sending the power consuming state attribute and/or the power consuming status attribute changed notification to the user by the notification means of the network management system, and providing the object name and the new attribute value of the varied object.

With the above technical solution, the division of the state information could be clearer and more efficient, meanwhile, the redundancy can be eliminated, in addition, the standardization can be improved and the adaptability is wide.

System Embodiment

Figure 12:
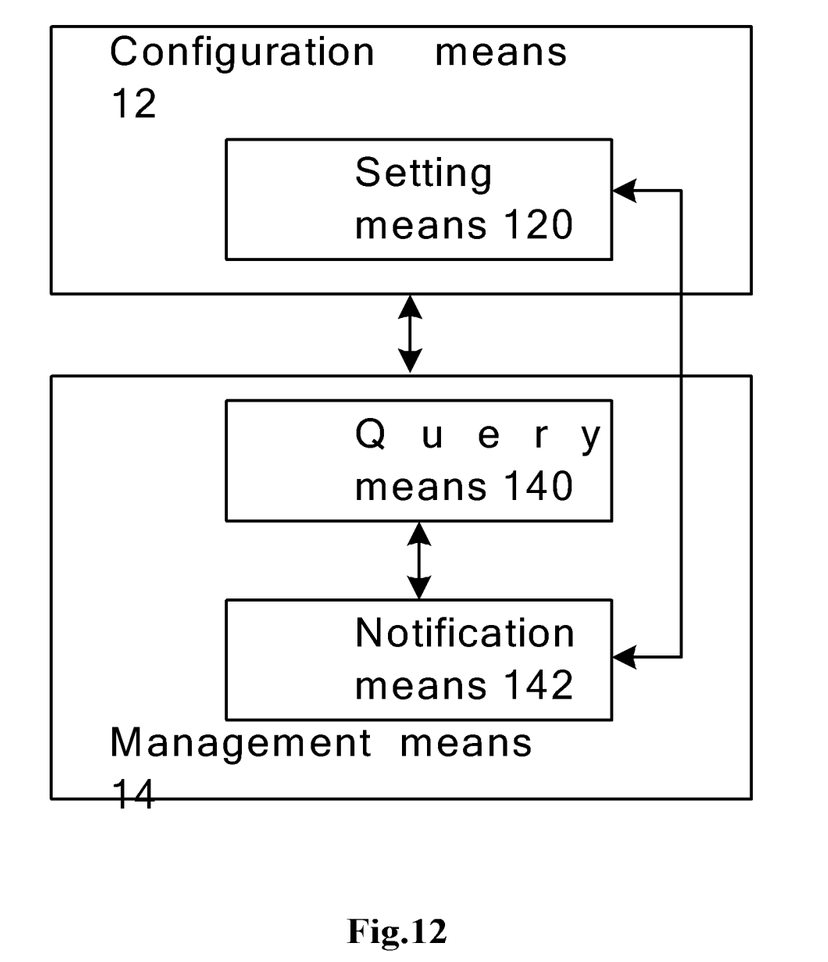
FIG. 12 is a block diagram of the power saving management system according to the embodiment of the present invention.

According to the embodiment of the present invention, a power saving management system is provided. FIG. 12 is a block diagram of the power saving management system according to the embodiment of the present invention. As shown in FIG. 12, the power saving management system according to the embodiment of the present invention comprises configuration means 12 and management means 14. The functions of the means will be detailed hereinafter.

Configuration means 12, configured to set a power consuming state attitude in the device object of a network management system, and to configure the power consuming state attribute, such that the power consuming state attitude is used to represent a power consuming state of electrical energy; the power consuming attribute state comprises at least a full power mode, a power saving mode, a sleeping mode and a shutdown mode;

Preferably, the configuration means 12 further comprises setting means 120, configured to set a power consuming status attribute according to the power consuming state attribute, wherein the power consuming status attribute comprises a power consuming status attribute value which is used to represent a percentage of a power consuming of the operation of the device under a power consuming state corresponding to the power consuming state attribute versus a maximum power consuming.

The management means 14 is connected to the configuration means 12, configured to perform the power saving management to the device by setting the power consuming state of the object corresponding to the device.

Preferably, the management means 14 further comprises query means 140 and notification means 142, wherein the query means 140 is configured to query the power consuming state attribute and/or the power consuming status attribute of the object; the notification means 142 is connected with the query means 140 and the setting means 120, as shown in FIG. 3, the notification means is configured to report a changing notification of the power consuming state attribute and/or power consuming status attribute in the case that that the power consuming state attribute and/or the power consuming status attribute are/is changed.

The power consuming state attribute of the device will be detailed hereinafter.

I. Under the condition that the power consuming state attribute of the device is set as the full power mode by the configuration means 12, the device will automatically set the power consuming status attribute value as the maximum device operation power.

II. Under the condition that the power consuming state attribute of the device is set as the power saving mode by the configuration means 12, the device will automatically set the power consuming status attribute value as the percentage of the minimum power that can ensure the normal service operation of the device and the maximum power consuming.

III. Under the condition that the power consuming state attribute of the device is set as the sleeping mode by the configuration means 12, the device will automatically set the power consuming status attribute value as the percentage of the minimum device power that keeps the memory before sleeping and the maximum power consuming.

IV. Under the condition that the power consuming state attribute of the device is set as the shutdown mode by the configuration means 12, the device will automatically set the power consuming status attribute value as not consuming the power of the device.

What needs to be explained is that in practical application, the configuration of the power consuming state and the setting of the power consuming status attribute can be separately performed by the configuration means 120, wherein the setting of the power consuming state is the order sent by the user of the network management system, and the configuration of the power consuming status is the order sent by the device managed by the network management system. After revising the power consuming state attribute according to the user order, the network management system will notifies the device, and the device will perform the operation to the state according to the notification, then the device notifies the new power consuming statues to the network management, and at least the setting means of the network management revises the power consuming status attribute.

The power saving management on the device in the communication network can be performed by using the technical proposal provided by the embodiment and by setting the configuration means and the management means.

Figure 13:
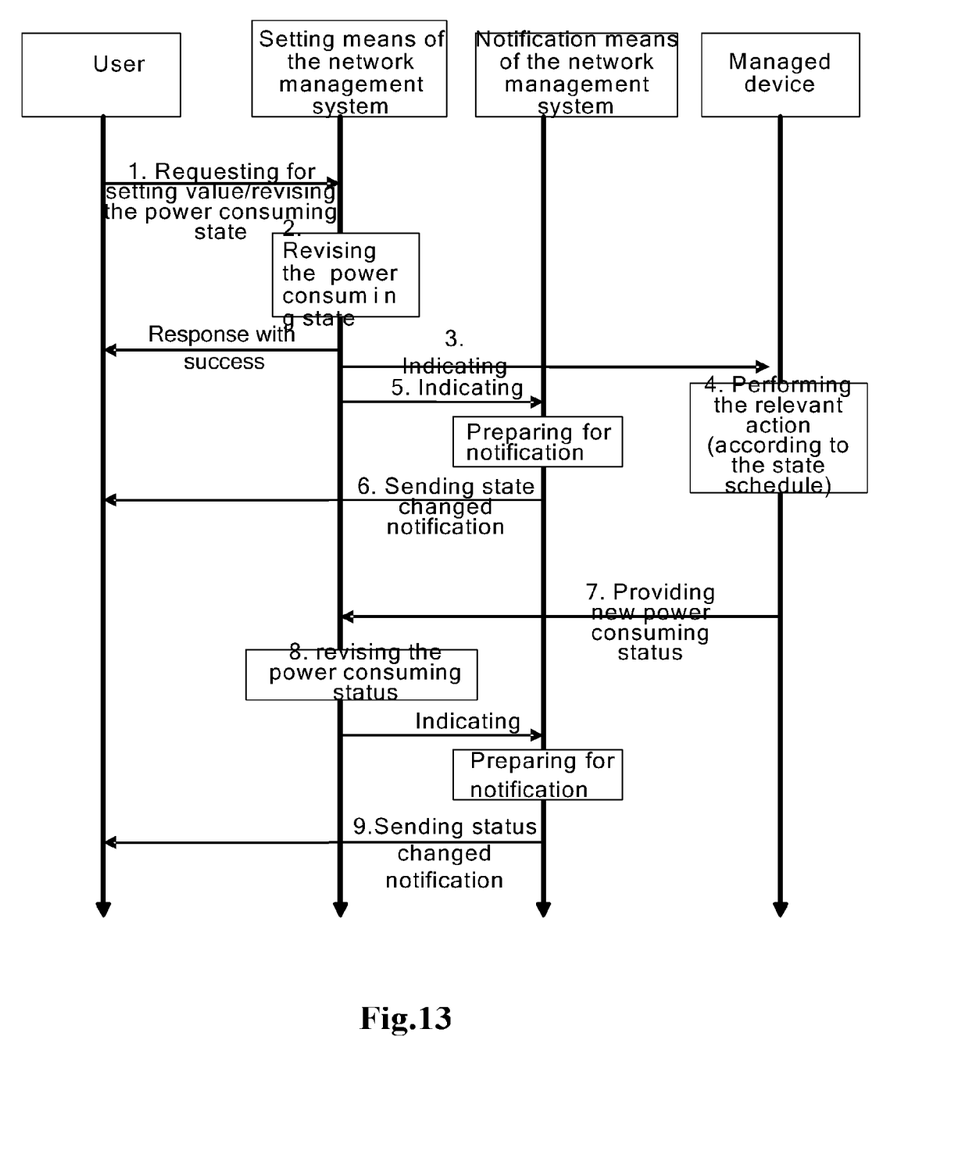
FIG. 13 is a flowchart of the signal interacted between the power saving management system and the user and the managed device according to the embodiment of the present invention.

The procedures will be detailed hereinafter based on the description and combined with FIG. 13. As shown in FIG. 13, the procedure of the power saving management system according to the embodiment of the present invention comprises the following processes:

1. The user sends request for setting value/revising power consuming state to the configuration means 120;
2. The setting means 120 revises the power consuming state of the managed device according the request of the user, and returns the successful response message to the user;
3. The setting means 120 sends order to the managed device to indicate the device to perform the newest power consuming state;
4. The managed device performs the relevant action in accordance with the state schedule and according to the order sent by the setting means 120;
5. The setting means 120 sends order to the notification means 142 to notify the means 142 that the power consuming state of the managed device has been revised, and prepares to notify the user;
6. The notification means 142 sends the power consuming state variation notification to the user according to the indication message of the setting means 120;
7. The managed device provides new power consuming status to the setting means 120;
8. The setting means 120 revises the power consuming status value according to the provided power consuming status, sends message to the notification means 142, indicates the notification means 142 that the power consuming status of the managed device has been revised, and prepares to notify the user;
9. The notification means 142 sends the power consuming status variation notification to the user according to the notification message sent by the setting means 120.

In a word, the power saving management on the device can be performed by using the technical proposal of the present invention, by configuring a new power consuming state attribute added for existing device object of the communication network management system and by configuring and setting the power consuming state, therefore solving the problem that the power saving management on the device of the communication network management system can not be realized in the prior art, and ensuring that the division of the state information could be clearer and more efficient, meanwhile, the redundancy can be eliminated, in addition, the standardization can be improved and the adaptability is wide.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

What is claimed is:

1. A method for power saving management, which is used to realize power saving management to a communication device, the method comprising:

setting a power consuming state attribute in a device object of a communication network management system, wherein the object represents the device, and configuring the power consuming state attribute, such that the power consuming state attribute is used to represent a power consuming state of the device;

performing the power saving management to the device by setting the power consuming state attribute of the object corresponding to the device, wherein the power consuming state comprises at least one of the following: a full power mode, a power saving mode, a sleeping mode and a shutdown mode;

setting a power consuming status attribute according to the power consuming state attribute, wherein the power consuming status attribute comprises a power consuming status attribute value which is used to indicate a percentage of a power consuming of operation of the device under a power consuming state corresponding to the power consuming state attribute versus a maximum power consuming;

when both the device and a subordinate device of the device support the power consuming state attribute:
- if the object is set at full power mode, setting a subordinate object corresponding to the subordinate device at full power mode;
- if the object is set at power saving mode, setting a subordinate object corresponding to the subordinate device at full power mode, power saving mode, sleeping mode or shutdown mode; and
- if the object is set at sleeping mode or shutdown mode, setting a subordinate object corresponding to the subordinate device at sleeping mode or shutdown mode;

when neither the device nor a subordinate device of the device supports power saving mode and when the device is set at power saving mode, operating the device and the subordinate device according to full power mode; and when the device and/or a subordinate device of the device does not support sleeping mode and/or shutdown mode and when the device is set at sleeping mode or shutdown mode, returning a setting failure operating message and keeping the device in its original state.

2. The method according to claim 1, wherein setting the power consuming status attribute value comprises:

automatically setting the power consuming status attribute value as the maximum power of the operation of the device, in the case that the power consuming state attribute of the device is set as the full power mode;

automatically setting the power consuming status attribute value as a percentage of a minimum power of the device capable of ensuring normal services versus the maximum power consuming, in the case that the power consuming state attribute of the device is set as the power saving mode;

automatically setting the power consuming status attribute value as a percentage of a minimum power of the device which keeps memories before sleeping and the maximum power consuming, in the case that the power consuming state attribute of the device is set as the sleeping mode; and automatically setting the power consuming status attribute value of the shutdown mode as that the device does not consume power, in the case that the power consuming state attribute of the device is set as the shutdown mode.

3. A system for power saving management, which is used to perform power saving management to a device, the system for power saving management comprising:

configuring means, configured to set a power consuming state attribute in a device object of a network management system, wherein the object represents the device, and to configure the power consuming state attribute such that the power consuming state attitude is used to represent a power consuming state of the device;

managing means, configured to perform the power saving management to the device by setting the power consuming state of the object corresponding to the device, wherein the power consuming state comprises at least one of the following: a full power mode, a power saving mode, a sleeping mode and a shutdown mode, and to perform power saving management to a subordinate device of the device by setting a power consuming state of a subordinate object corresponding to the subordinate device according to the power consuming state of the object; and setting means, configured to set a power consuming status attribute according to the power consuming state attribute, wherein the power consuming status attribute comprises a power consuming status attribute value which is used to represent a percentage of a power consuming of the operation of the device under a power consuming state corresponding to the power consuming state attribute versus a maximum power consuming.

4. The system for power saving management according to claim 3, wherein the managing means further comprising:
query means, configured to query the power consuming state attribute and/or the power consuming status attribute of the object.

5. The system for power saving management according to claim 3, wherein the managing means further comprising:
notifying means, configured to report a changing notification of the power consuming state attribute and/or power consuming status attribute in the ease that that the power consuming state attribute and/or the power consuming status attribute are/is changed.

* * * * *